(12) United States Patent
Barone et al.

(10) Patent No.: US 9,584,434 B2
(45) Date of Patent: *Feb. 28, 2017

(54) METHODS AND APPARATUS FOR SIMULTANEOUSLY HOSTING MULTIPLE SERVICE PROVIDERS ON A NETWORK

(71) Applicant: QUALCOMM Incorporated, San Diego, CA (US)

(72) Inventors: Joseph P. Barone, San Diego, CA (US); An Mei Chen, San Diego, CA (US); Gordon Kent Walker, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 13/894,518

(22) Filed: May 15, 2013

(65) Prior Publication Data
US 2013/0254398 A1    Sep. 26, 2013

Related U.S. Application Data

(63) Continuation of application No. 11/139,302, filed on May 27, 2005, now Pat. No. 8,473,570.
(Continued)

(51) Int. Cl.
*H04L 12/911*    (2013.01)
*H04L 29/08*    (2006.01)
(Continued)

(52) U.S. Cl.
CPC ............ *H04L 47/70* (2013.01); *H04L 67/306* (2013.01); *H04L 67/327* (2013.01); *H04W 8/245* (2013.01); *H04W 48/18* (2013.01)

(58) Field of Classification Search
None
See application file for complete search history.

(56) References Cited

U.S. PATENT DOCUMENTS 5,613,213 A    3/1997    Naddell et al.
6,494,762 B1    12/2002    Bushmitch et al.
(Continued)

FOREIGN PATENT DOCUMENTS

CN    1444414 A    9/2003
CN    1572098 A    1/2005
(Continued)

OTHER PUBLICATIONS

European Search Report—EP13005144—Search Authority—Munich—Jan. 2, 2014.
(Continued)

*Primary Examiner* — Sulaiman Nooristany
(74) *Attorney, Agent, or Firm* — The Marbury Law Group, PLLC

(57) ABSTRACT

Methods and apparatus for simultaneously hosting multiple service providers on a network. A method is provided for hosting multiple service providers in a data network. The method includes controlling access to services offered by one or more service providers, and discovering affiliation provisions associated with a device, wherein the affiliation provisions are associated with one or more selected service providers. The method also includes filtering the services according to the affiliation provisions to generate a package database of services offered by the one or more selected service providers, and transmitting the package database to the device.

12 Claims, 5 Drawing Sheets

Related U.S. Application Data

(60) Provisional application No. 60/678,364, filed on May 5, 2005.

(51) Int. Cl.
*H04W 8/24* (2009.01)
*H04W 48/18* (2009.01)

(56) References Cited

U.S. PATENT DOCUMENTS

| | | |
|---|---|---|
| 6,577,614 B1 | 6/2003 | Cook et al. |
| 6,622,017 B1 | 9/2003 | Hoffman |
| 6,987,976 B2 | 1/2006 | Kohar et al. |
| 6,999,763 B2 | 2/2006 | Ramalho et al. |
| 7,024,557 B1 | 4/2006 | Moles et al. |
| 7,171,198 B2 | 1/2007 | Paila et al. |
| 7,269,629 B2 | 9/2007 | Zmudzinski et al. |
| 7,319,888 B2 | 1/2008 | Li et al. |
| 7,324,815 B2 | 1/2008 | Ross et al. |
| 7,603,109 B2 | 10/2009 | Barone et al. |
| 7,606,918 B2 | 10/2009 | Holzman et al. |
| 2002/0037723 A1 | 3/2002 | Roach |
| 2002/0087674 A1 | 7/2002 | Guilford et al. |
| 2003/0065738 A1 | 4/2003 | Yang et al. |
| 2003/0186704 A1 | 10/2003 | Tamura et al. |
| 2003/0235147 A1 | 12/2003 | Walton et al. |
| 2004/0003032 A1 | 1/2004 | Ma et al. |
| 2004/0102182 A1 | 5/2004 | Reith et al. |
| 2004/0127205 A1 | 7/2004 | Mahajan |
| 2004/0254993 A1 | 12/2004 | Mamas |
| 2004/0266440 A1 | 12/2004 | Fuchs et al. |
| 2005/0037746 A1* | 2/2005 | Ramalho ............... H04W 88/06 455/422.1 |
| 2005/0065801 A1 | 3/2005 | Poikselka et al. |
| 2005/0090235 A1* | 4/2005 | Vermola ............... H04H 20/57 455/414.3 |
| 2006/0183500 A1 | 8/2006 | Choi |
| 2006/0190320 A1 | 8/2006 | Dewa et al. |
| 2006/0253596 A1 | 11/2006 | Barone et al. |
| 2007/0027961 A1 | 2/2007 | Holzer |
| 2009/0323593 A1 | 12/2009 | Barone et al. |

FOREIGN PATENT DOCUMENTS

| | | |
|---|---|---|
| EP | 0955737 A2 | 11/1999 |
| JP | 2000022705 A | 1/2000 |
| JP | 2000231530 A | 8/2000 |
| JP | 2001308932 A | 11/2001 |
| JP | 2002007260 A | 1/2002 |
| JP | 2002056304 | 2/2002 |
| JP | 2002182768 A | 6/2002 |
| JP | 2002196969 A | 7/2002 |
| JP | 2002259381 A | 9/2002 |
| JP | 2002328855 A | 11/2002 |
| JP | 2002374567 A | 12/2002 |
| JP | 200376635 | 3/2003 |
| JP | 2003085084 | 3/2003 |
| JP | 2003115796 | 4/2003 |
| JP | 2003523101 | 7/2003 |
| JP | 2003242065 A | 8/2003 |
| JP | 2003283422 A | 10/2003 |
| JP | 2003333182 | 11/2003 |
| JP | 2004070936 A | 3/2004 |
| JP | 2004088741 | 3/2004 |
| JP | 2004326459 A | 11/2004 |
| JP | 2005115533 A | 4/2005 |
| KR | 1020010067324 | 7/2001 |
| KR | 20030089364 A | 11/2003 |
| TW | 532001 | 5/2003 |
| WO | 9966747 A2 | 12/1999 |
| WO | 02078316 A2 | 10/2002 |
| WO | 02103514 A2 | 12/2002 |
| WO | 03032664 A1 | 4/2003 |
| WO | 03067496 A2 | 8/2003 |
| WO | 2004030389 A1 | 4/2004 |
| WO | 2004036941 | 4/2004 |

OTHER PUBLICATIONS

Taiwan Search Report—TW100103236—TIPO—Jul. 23, 2013.
Eleftheriadis G.P., et al., "User Profile Identification in Future Mobile Telecommunications Systems", IEEE Network, IEEE Service Center, New York, NY, US, vol. 8, No. 5, Sep. 1, 1994 (Sep. 1, 1994), pp. 33-39, XP000606584, ISSN: 0890-8044, DOI: 10.1109/65.313012.
International Search Report—PCT/US06/017415, International Search Authority—ISA/US, Sep. 21, 2007.
Rusu, et al., "Planarization of Deep Trenches," Proceedings of SPIE, 2001, pp. 49-57, vol. 4557.
Supplementary European Search Report—EP06759158—Search Authority—Munich—Mar. 22, 2013.
Taiwan Search Report—TW095116087—TIPO—Oct. 10, 2011.
Taiwanese Search report—095116087—TIPO—Jun. 29, 2010.
Written Opinion—PCT/US06/017415, International Search Authority—ISA/US, Sep. 21, 2007.

* cited by examiner

METHODS AND APPARATUS FOR SIMULTANEOUSLY HOSTING MULTIPLE SERVICE PROVIDERS ON A NETWORK

CLAIM OF PRIORITY UNDER 35 U.S.C. §119

This application is a continuation of U.S. patent application Ser. No. 11/139,302 entitled "Methods and Apparatus for Simultaneously Hosting Multiple Service Providers on a Network" filed May 27, 2005, which claims the benefit of priority of U.S. Provisional Patent Application No. 60/678,364 entitled "Methods and Apparatus for Simultaneously Hosting Multiple Service Providers on a Network" filed May 5, 2005. The entire contents of both applications are hereby incorporated by reference.

REFERENCE TO RELATED APPLICATIONS

The present Application for Patent is related to U.S. patent application Ser. No. 11/139,130 entitled "Methods and Apparatus for Over-the-Air Subscriptions filed May 27, 2005 (issued as U.S. Pat. No. 7,603,109) the entire contents of which are hereby incorporated by reference.

I. Field

The present invention relates generally to providing services in a network environment, and more particularly, to methods and apparatus for simultaneously hosting multiple service providers on a data network.

II. Background

Data networks, such as wireless communication networks, have to trade off between services customized for a single terminal and services provided to a large number of terminals. The distribution of services to a large number of terminals (subscribers) is a complicated problem. This is especially true if the terminals are mobile devices that communicate using relatively slow speed over-the-air communication links. Therefore, it is very important for network administrators and service providers to have a way that allows terminals to easily and efficiently subscribe to receive content and/or other network services.

In current content delivery/media distribution systems, service providers make services available over proprietary networks, so that devices operating on their networks will have the ability to receive those services. Additionally, service providers have also made available affiliated devices for use on their proprietary networks. For example, a device may be referred to as an "affiliated" device if a particular service provider has provided the device, or services associated with the device, based on an agreement with the user. In return, the device user agrees to operate the device on the particular service provider's network and/or to receive particular services from that service provider. Thus, in the telecommunication industry for example, device users operate their devices on telecommunication networks and generally receive services offered by the providers of those networks.

However, it has become increasingly evident that device users would like to receive services from multiple service providers. For example, devices operating on one proprietary network may not have access to services offered on other proprietary networks. Unfortunately, there currently exists no way for multiple service providers to make their services available to devices operating on proprietary networks.

Therefore, what is needed is a way for multiple service providers to make their services available for subscription by a wide range of devices that are connected to one or more proprietary data networks. However, to conform to existing service agreements, the system should also operate so that affiliated devices are limited to subscribing only to services offered by selected service providers according to any affiliation provisions.

SUMMARY

In one or more embodiments, a system is provided for hosting multiple service providers on a data network. In one embodiment, a content distribution server has access and/or control of services available from one or more service providers. The services comprise any suitable type of service that is available. For example, the services comprise any type of service function or content, such as multimedia content, programs, data, support services, such as customer services, or accounting services. Devices that wish to subscribe to or utilize these services go through an activation process that reveals any existing affiliation provisions. In one embodiment, after the activation process, the content distribution server transmits a database of available services to the activated device. The available services are filtered from all services under the control of the content distribution server based on the discovered affiliations. In another embodiment, the database of services includes all services available from the content distribution server, and the device operates to filter this database according to any affiliations to derive a list of services that are available to that particular device. The device user may then purchase or subscribe to any of the available services by sending a request to the content distribution server. In response, the content distribution server either provides the services directly, or authorizes a third-party to provide the requested services. Therefore, the system operates to host services from multiple service providers at a single entity, and further operates to limit device access to services according to existing affiliation provisions In one embodiment, a method is provided for hosting multiple service providers in a data network. The method comprises controlling access to services provided by one or more service providers, and discovering affiliation provisions associated with a device, wherein the affiliation provisions are associated with one or more selected service providers. The method also comprises filtering the services according to the affiliation provisions to generate a package database of services offered by the one or more selected service providers, and transmitting the package database to the device.

In one embodiment, apparatus is provided for hosting multiple service providers in a data network. The apparatus comprises processing logic that operates to control access to services offered by one or more service providers, and affiliation logic that operates to discover affiliation provisions associated with a device, wherein the affiliation provisions are associated with one or more selected service providers. The apparatus also comprises package generation logic that operates to filter the services according to the affiliation provisions to generate a package database of services offered by the one or more selected service providers, and transceiver logic that operates to transmit the package database to the device.

In one embodiment, apparatus is provided for hosting multiple service providers in a data network. The apparatus comprises means for controlling access to services offered by one or more service providers, and means for discovering affiliation provisions associated with a device, wherein the affiliation provisions are associated with one or more selected service providers. The apparatus also comprises means for filtering the services according to the affiliation provisions to generate a package database of services offered by the one or more selected service providers, and means for transmitting the package database to the device.

In one embodiment, a computer-readable media is provided comprising instructions, which when executed by a processor, operate to host multiple service providers in a data network in a data network. The computer-readable media comprises instructions for controlling access to services offered by one or more service providers, and instructions for discovering affiliation provisions associated with a device, wherein the affiliation provisions are associated with one or more selected service providers. The computer-readable media also comprises instructions for filtering the services according to the affiliation provisions to generate a package database of services offered by the one or more selected service providers, and instructions for transmitting the package database to the device.

In one embodiment, a method is provided for operating a device in a system that hosts multiple service providers in a data network. The method comprises requesting access to services offered by one or more service providers, and discovering affiliation provisions associated with the device, wherein the affiliation provisions are associated with one or more selected service providers. The method also comprises receiving a package database, and filtering the package database according to the affiliation provisions to generate a package database of services offered by the one or more selected service providers.

In one embodiment, apparatus is provided for use in a system that hosts multiple service providers in a data network. The apparatus comprises processing logic that operates to request access to services offered by one or more service providers, and discover affiliation provisions associated with the device, wherein the affiliation provisions are associated with one or more selected service providers. The apparatus also comprises receiving logic that operates to receive a package database, and affiliation filter logic that operates to filter the package database according to the affiliation provisions to generate a package database of services offered by the one or more selected service providers.

In one embodiment, apparatus is provided for use in a system that hosts multiple service providers in a data network. The apparatus comprises means for requesting access to services offered by one or more service providers, and means for discovering affiliation provisions associated with the device, wherein the affiliation provisions are associated with one or more selected service providers. The apparatus also comprises means for receiving a package database, and means for filtering the package database according to the affiliation provisions to generate a package database of services offered by the one or more selected service providers.

In one embodiment, a computer-readable media is provided comprising instructions, which when executed by a processor, operate to subscribe for services in a system that hosts multiple service providers in a data network. The computer-readable media comprises instructions for requesting access to services offered by one or more service providers, and instructions for discovering affiliation provisions associated with the device, wherein the affiliation provisions are associated with one or more selected service providers. The computer-readable media also comprises instructions for receiving a package database, and instructions for filtering the package database according to the affiliation provisions to generate a package database of services offered by the one or more selected service providers.

Other aspects, advantages, and features of the present invention will become apparent after review of the hereinafter set forth Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes one or more embodiments of a system for hosting multiple service providers in a data network. The system is especially well suited for use in wireless networks environments, but may be used in any type of network environment, including but not limited to, communication networks, public networks, such as the Internet, private networks, such as virtual private networks (VPN), local area networks, wide area networks, long haul network, or any other type of data network.

It should be noted that certain non-essential information relating to a device subscription system is not presented herein. A full description of one type of subscription system that may be utilized in one or more embodiments can be found in the U.S. Patent Application referenced above.

The following definitions are used herein to describe one or more embodiments of a system to host multiple service providers.

Service Provider The term "service provider" is used herein to mean any entity that provides a service.

Service A service is offered by a service provider. For example, a service comprises service functions or content. For example, the service functions comprise billing and customer service, invoicing, support services, accounting, system services, or any other type of service function. A service may also comprise content such as multimedia content, audio, video, media presentations, programs, scripts, data or any other type of suitable content. For example, a service may comprise a sequence of media presentations that represents the smallest element that may be subscribed to in the subscription system.

Tier A tier is a collection of one or more services.

Package A package (or "Service Package") is a collection of one or more tiers that are offered on a subscription basis.

Figure 1:
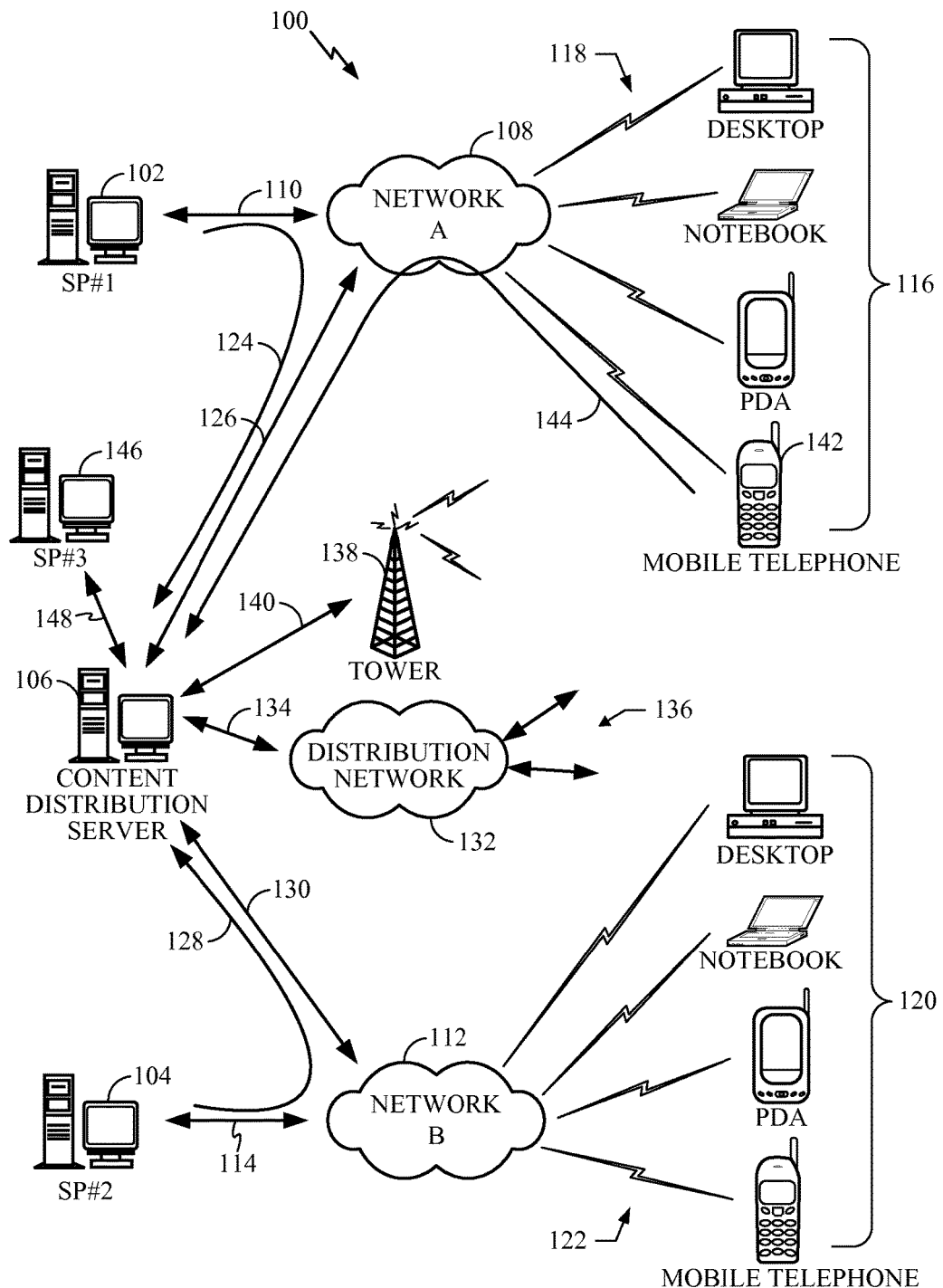
FIG. 1 shows a network that comprises one embodiment of a system to host multiple service providers.

FIG. 1 shows a network 100 that comprises one embodiment of a system to host multiple service providers. The network 100 comprises a first service provider 102, a second service provider 104, a third service provider 146, and a content distribution server 106. The service providers 102, 104, and 146 comprise service providers as described above. It should be noted that although only three service providers are shown in FIG. 1, the system is suitable for use with virtually any number of service providers. The first service provider 102 communicates with network A 108 via the communication link 110, which may comprise any type of wired or wireless communication channel. The second service provider 104 communicates with a network B 112 via the communication link 114, which may comprise any type of wired or wireless communication channel. The first service provider 102 and the second service provider 104 operate to provide services as described above to entities in communication with the networks A and B. The third service provider 146 communicates with, and offers services through, the content distribution server 106.

The network A 108 communicates with a variety of devices shown generally at 116. For example, the devices shown at 116 comprise a desktop computer, notebook computer, PDA and mobile telephone. The devices 116 communicate with the network 108 via communication links shown generally at 118. The communication links 118 comprise any suitable type of wireless and/or wired communication links that allow the devices 116 to communicate with the network 108. For example, the communication links 118 comprise CDMA, GSM or other type of mobile telephone link, Bluetooth, WiFi or any other type of wireless communication link, or a wired link such as an Ethernet communication link. The network 108 comprises any suitable type or combination of wired and/or wireless networks.

The network 112 communicates with a variety of devices shown generally at 120. For example, the devices shown at 120 comprise a desktop computer, notebook computer, PDA and mobile telephone. The devices 120 communicate with the network 112 via communication links shown generally at 122. The communication links 122 comprise any suitable type of wireless and/or wired communication links that allow the devices 120 to communicate with the provider network 112. For example, the communication links 122 comprise CDMA, GSM or other type of mobile telephone link, Bluetooth, WiFi or any other type of wireless communication link, or a wired link such as an Ethernet communication link. The network 112 comprises any suitable type or combination of wired and/or wireless networks.

In one embodiment, one or more of the devices 116 and 120 are affiliated device that have device "affiliations." An affiliated device is a device that has been acquired or operates based on a subsidy or support from a particular service provider. For example, a device may be acquired for a discounted price from a selected service provider if the device owner agrees to operate the device on a selected network and/or receive for services provided by a particular service provider. Thus, the devices 116 may have device affiliations that require those devices to receive selected services from service provider 102, and the devices 120 may have device affiliations that require those devices to receive selected services from service provider 104. Additionally, the devices may have affiliations with the service provider 146 and obtained selected services from that provider.

The content distribution server 106 operates to store and/or control access to services provided by the service providers 102, 104, and 146. For example, in one embodiment, the service provider 102 transmits information, services and/or control of available services to the content distribution server 106, as shown by path 124 utilizing link 126. Similarly, the service provider 104 transmits information, services and/or control of available services to the content distribution server 106, as shown by path 128 utilizing link 130. Furthermore the service provider 148 transmits information, services and/or control of available services directly to the content distribution server 106 as shown by path 148. Thus, the content distribution server 106 is provisioned to access and/or control the services provided by the service providers 102, 104, and 146.

In one embodiment, the content distribution server 106 communicates with a distribution network 132 via communication link 134. For example, the communication link 134 may comprise any suitable type of wired and/or wireless communication link. The distribution network 132 communicates with other networks and/or network entities via the communication links 136. For example, the distribution network 132 may communicate with other networks or individual devices (i.e., the devices 116 and 120).

The content distribution server 106 also communicates with a transmission tower 138 via the link 140 to allow information to be wirelessly transmitted to receiving terminals. For example, in one embodiment, the receiving terminals may comprise the devices 116 and/or the devices 120. Thus, information at the content distribution server 106 may be directly transmitted to the devices 116 and 120 without the use of the provider networks 108 and 112.

During operation of one embodiment of the system for hosting multiple service providers, the content distribution server 106 operates to control access to services provided by service provider 102, 104, and 146. The devices 116 and 120 are activated (or configured), so that they are recognized by the content distribution server 106 as devices that are authorized to request and receive services. In one embodiment, activation of a device results in either or both of the content distribution server 106 and the device 116 discovering any affiliations associated with the device. A more detailed description of the activation process is provided in another section of this document.

After activation of a device, a database of available services is delivered to the device from the content distribution server 106. In one embodiment, if the device is an affiliated device, then the content distribution server 106 operates to filter the available service to provide a database that lists only those services available to the device based on the affiliations associated with the device. For example, the mobile telephone 142 may be an affiliated device that has agreed to receive services from the service provider 102. The telephone 142 will therefore receive a database listing only those services available from service provider 102 according to existing affiliation. Thus, the filtering of available services according to the device affiliations is performed at the content distribution server 106.

In another embodiment, the filtering of available services is performed at the device (i.e., telephone 142). For example, the content distribution server 106 transmits a database of all available services (from all service providers) to the telephone 142 and the telephone 142 filters the database so that only those services allowed in accordance with the device affiliations are display to the user of the telephone 142. Thus, in this embodiment, the telephone 142 operates to filter the list of all available services according any affiliations to generate a list of services available to the telephone 142.

Once a device is activated and a list of available service is provided, the device may transmit a request (to receive and/or subscribe to one or more of the available services) to the content distribution server 106, as shown by path 144. The content distribution server 106 then operates to process the request and either provide the requested services directly, or authorize a third party to provide the requested services. In one embodiment, the content distribution server 106 operates to notify the service provider associated with the requested services so that invoicing, support, maintenance, and/or other administration functions my be performed.

In one or more embodiments, a content distribution server operates in a system for hosting multiple service providers by performing one or more of the following steps.

1. Obtain access and/or control of services offered by each service provider.
2. Activate a device to request and receive one or more services, wherein the content distribution server and/or the device discover any existing affiliations associated with the device.
3. Transmit a database of services to the activated device, wherein the database of services are filtered in accordance with any existing affiliations.
4. Accept a request for services from the device.
5. Provide the requested services to the requesting device, or authorize a third party to provide the requested services.

In one embodiment, the system of hosting multiple service providers operates to provide services directly to receiving devices via the distribution network 132 and/or direct transmissions using the tower 138. For example, requests for services from one or more devices are received at the content distribution server 106. The requests may be transmitted via the provider network 108 or the provider network 112. In another embodiment, the requests may be transmitted using any other type communication channel and/or out-of-band channel that allow remote devices to communicate with the content distribution server 106. The content distribution server 106 processes the requests for services (accounting for any device affiliations if necessary) and the requested services are provided to the requesting devices via the distribution network 132 or directly transmitted to the requesting devices via the transmission tower 138. Therefore, it is possible for any service available at the content distribution server 106 to be provided directly to requesting devices without the use of the networks 108 and 112. Thus, services provided by either the service provider 102 or the service provider 104 may be provided to a requesting device. The operation of this embodiment does not require services to be provided over a particular network, and so it is possible for devices to avoid the limitations associated with device affiliations. Thus, a device may obtain any available services at the content distribution server 106 regardless of which service provider provides the service.

It should be noted that the network 100 illustrates just one network configuration, and that other network configurations or arrangements are possible within the scope of the described embodiments.

Figure 2:
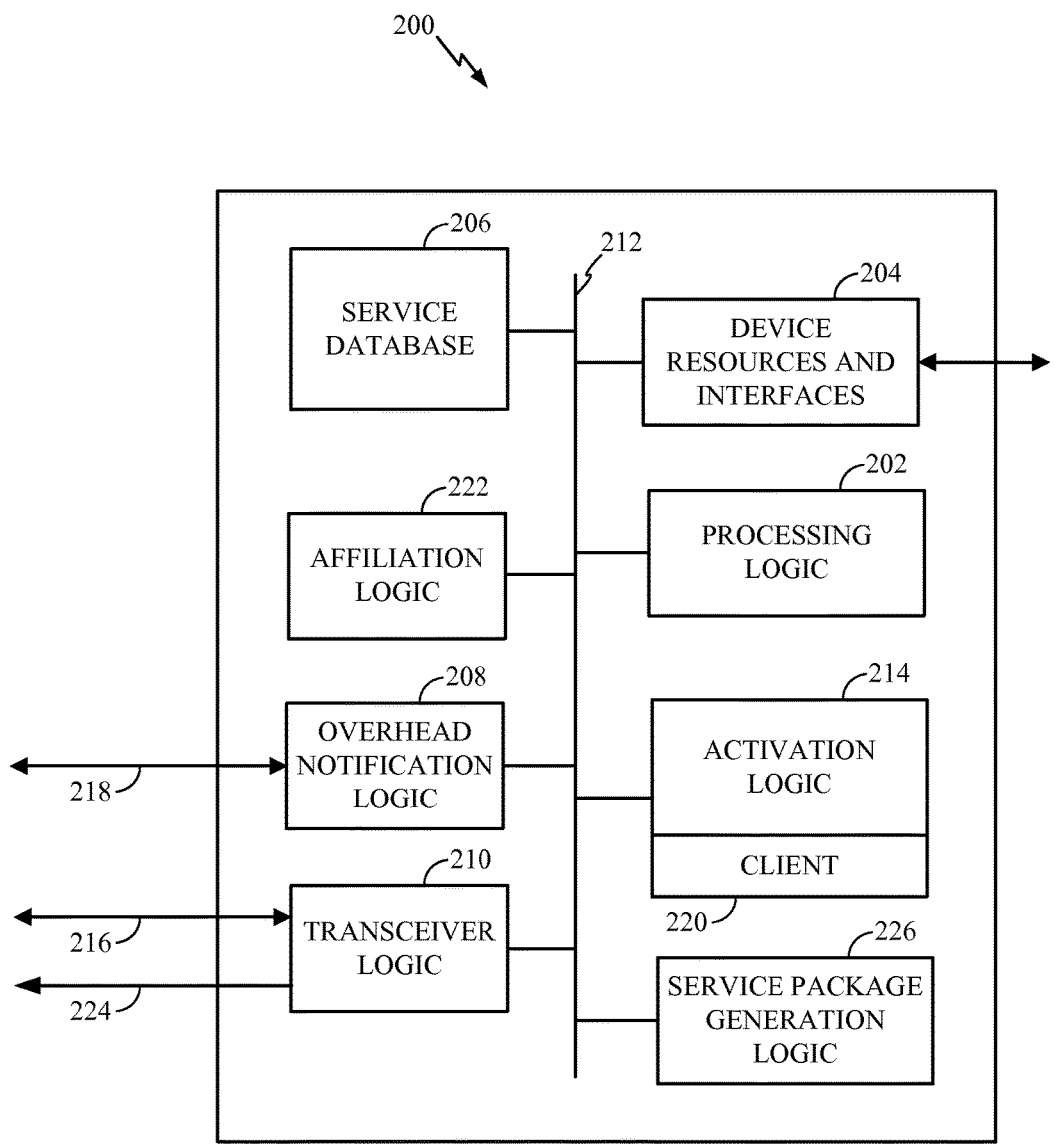
FIG. 2 shows a detailed diagram of one embodiment of a content distribution server suitable for use in one or more embodiments of a system for hosting multiple service providers in a data network.

FIG. 2 shows a detailed diagram of one embodiment of a content distribution server 200 suitable for use in one or more embodiments of a system for hosting multiple service providers in a data network. For example, the server 200 may be used as the server 106 in FIG. 1. The server 200 comprises processing logic 202, device resources 204, service database 206, overhead notification logic 208, and transceiver logic 210, all coupled to an internal data bus 212. The server 200 also comprises activation logic 214, affiliation logic 222, and service package generation logic 226, which are also coupled to the data bus 212.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions and to control one or more other functional elements of the server 200 via the internal data bus 212.

The device resources and interfaces 204 comprise hardware and/or software that allow the server 200 to communicate with internal and external systems. For example, internal systems may include mass storage systems, memory, display driver, modem, or other internal device resources. The external systems may include user interface devices, printers, disk drives, or other local devices or systems.

The service database 206 comprises any type of memory device suitable for storing information about service packages available from one or more service providers. For example, the service database 206 may comprise information such as service provider identifiers, package identifiers, service or tier identifiers, scheduling or licensing information, pricing, and/or any other type of information relevant to available service packages.

The transceiver logic 210 comprises hardware and/or software that operates to allow the server 200 to transmit and receive data and/or other information with remote devices or systems via communication channel 216. For example, in one embodiment, the communication channel 216 comprises any suitable type of communication link to allow the server 200 to communicate with one or more data networks. For example, in one embodiment, the communication channel 216 allows the server 200 to communicate with the data networks 108, 112, and 132 shown in FIG. 1. The transceiver logic 210 also comprises transmission link 224 that allows information to be directly broadcast from a transmission tower. For example, the transmission link 224 may operate as the communication link 140 shown in FIG. 1.

The activation logic 214, the client 220, and the overhead notification logic 208 are used by the server 200 during an activation process by which devices are activated, and therefore authorized to request and receive services provided by one or more service providers. A brief description of the operation of these functional elements is provided below.

The activation logic 214 comprises a CPU, processor, gate array, hardware logic, memory elements, virtual machine, software, and/or any combination of hardware and software. The activation logic 214 operates to activate a device to request and/or subscribe to services available at the server 200. The activation process need only occur once for each device that desires to request and/or subscribe to services. For example, in one embodiment, the activation logic 214 comprises a client program 220 that is downloaded to the device during the activation process. For example, the client 220 is downloaded to the device using the transceiver logic 210. Once a device is activated by the activation logic 216, the client program 220 runs on the device and operates to receive and display information about available service packages to the device user. Thus, the activation logic 214 operates to allow the server 200 to know who a device is, how to invoice the device, authenticate the device, and provision the device to run the client 220.

The overhead notification logic 208 comprises hardware and/or software that operates to allow the server 200 to establish and communicate over an overhead notification channel (ONC) 218. The ONC 218 allows the server 200 to communicate in the background with the client 220 running on a device. For example, in one embodiment, the ONC 218 comprises a wireless link to a device that allows data to be transmitted to the device in a manner that is transparent to the device user. In one embodiment, the overhead notification logic 208 is used to transparently transmit information about available service packages to a device. In one embodiment, the overhead notification logic 208 is part of the transceiver logic 210 and the ONC 218 is part of the communication channel 216.

The affiliation logic 222 comprises a CPU, processor, gate array, hardware logic, memory elements, virtual machine, software, and/or any combination of hardware and software. The affiliation logic 222 operates to determine whether or not a device is an affiliated device. For example, during the activation process, information received at the server 200 about the device is processed by the affiliation logic 222 to determine if the device is an affiliated device. For example, in one embodiment, the device provides a unique identification number that is matched to identification numbers provided to the server 200 by various service providers and stored in the service database 206. If the device identification number matches a number provided by a selected service provider, then the affiliation logic 222 determines that that device is affiliated with that service provider.

The service package generation logic 226 comprises a CPU, processor, gate array, hardware logic, memory elements, virtual machine, software, and/or any combination of hardware and software. The generation logic 226 operates to generate a package database of services that are available to a device that has been activated. For example, the generation logic 226 operates to receive input from the affiliation logic 222 and the service database 206 to generate a package database for transmission to a device. The input from the affiliation logic 222 indicates whether or not the device is an affiliated device. The information about the affiliation is used to process information received from the service database 206 to produce a database of services that are available for the device to purchase and/or subscribe to. For example, information from the service database 206 includes information about services offered by a selected service provider that has subsidized or supported the ownership or operation of the device.

In one embodiment, the system for hosting multiple service providers comprises program instructions stored on a computer-readable media, which when executed a processor, for instance, the processing logic 202, provides the functions of the server 200 described herein. For example, instructions may be loaded into the server 200 from a computer-readable media, such as a floppy disk, CDROM, memory card, FLASH memory device, RAM, ROM, or any other type of memory device or computer-readable media that interfaces to the server 200 via the device resources 204. In another embodiment, the instructions may be downloaded into the server 200 from an external device or network resource that interfaces to the sever 200 via the transceiver logic 210. The instructions, when executed by the processing logic 202, provide one or more embodiments of a system for hosting multiple service providers as described herein.

Figure 3:
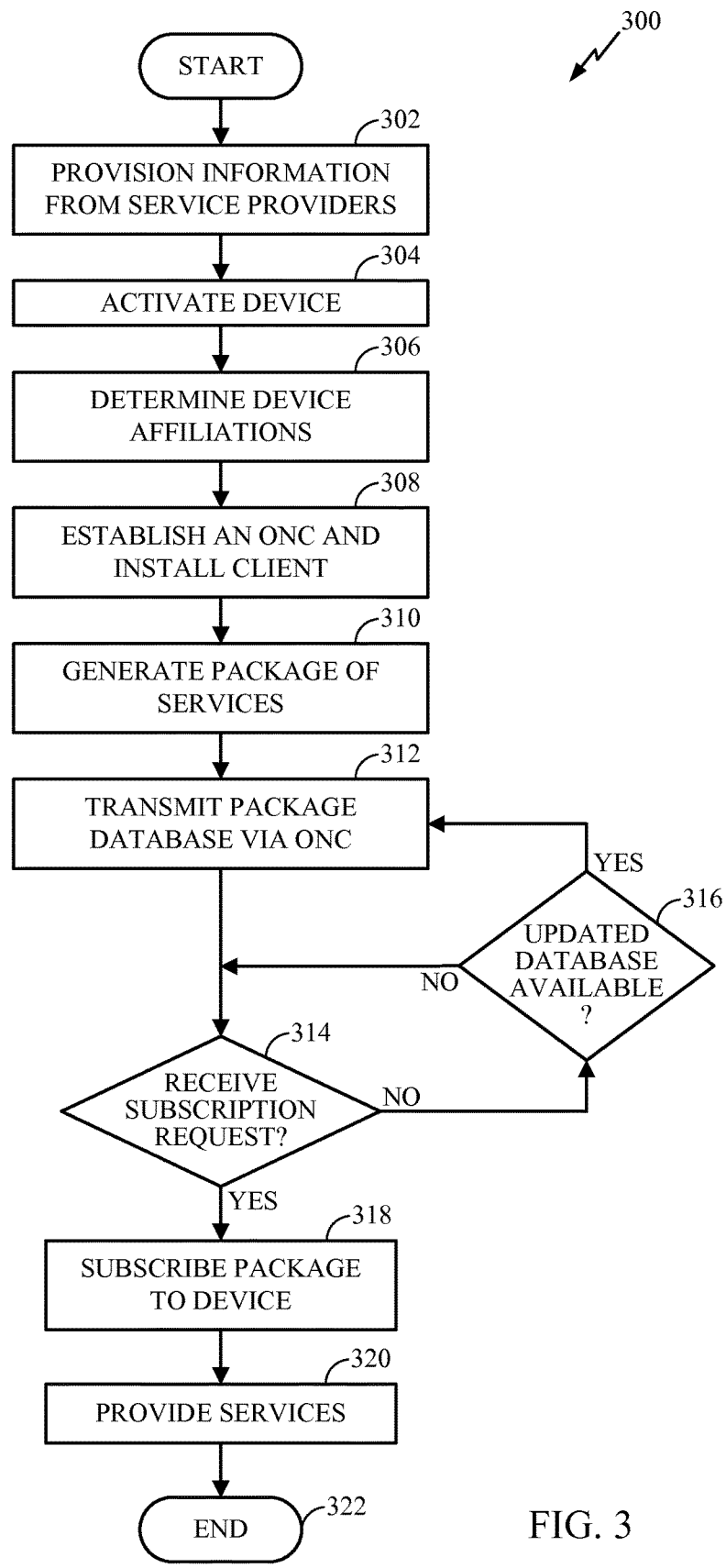
FIG. 3 shows one embodiment of a method for operating a server in one embodiment of a system for hosting multiple service retailers.

FIG. 3 shows one embodiment of a method 300 for operating a server in one embodiment of a system for hosting multiple service retailers. For clarity, the method 300 will be described with reference to the server 200 shown in FIG. 2. In one or more embodiments, the processing logic 202 executes program instructions and controls the operation of the server 200 to perform the functions described below.

At block 302, the server is provisioned with information about services offered by one or more service providers. For example, the server 200 communicates with the various service providers to retrieve information about the services offered by each provider. The information may include, content, programs, applications, billing, invoicing, licensing information, identification of affiliated devices associated with each service provider, and any other information that may be needed to offer the services of each service provider. In one embodiment, the information provided by each service provider is stored in the service database 206.

At block 304, a device is activated so that it may purchase or subscribe to one or more service packages using one or more embodiments of a system for hosting multiple service providers. For example, the device may be a wireless device that contacts the server 200 and provides the required activation information. In one embodiment, the device communicates with the processing logic 202 via the transceiver logic 210 to provide secure authenticated information for activation purposes. For example, the information may comprise device identity, user identity, billing information, and any other type of relevant information.

At block 306, the information provided by the device during the activation process is used to determine whether or not the device is an affiliated device. For example, the information is processed by the affiliation logic 222 to determine if the device is an affiliated device. In one embodiment, the affiliation logic 222 compares a device identifier provided by the device during activation with device identifiers provided by the service providers and stored in the service database 206. If a match is found, the device is determined to be affiliated with the service provider associated with the matching identifier. It is also possible to determine if the device is an affiliated device and to which service provider the device is affiliated with by using any other technique.

At block 308, an ONC is established between the server and the device, and a client is downloaded to the device. For example, the overhead notification logic 208 establishes the ONC 218 with the device and the client 220 is downloaded and installed on the device.

At block 310, a package of services available to the device is generated. For example, the service package generation logic 226 receives information from the affiliation logic 222 that the device is an affiliated device. The service package generation logic 226 receives information about available services from the service database 206. The information from the service database 206 includes information from the service provider that is affiliated with the device. This information is compiled into a package database that will be transmitted to the device. Thus, the server 200 filters out services that are available to the device from all the services available by all service providers that are stored in the service database 206.

At block 312, the package database is transmitted to the device using the ONC 218 and it is then locally cached on the device. For example, the processing logic 202 controls the overhead notification logic 208 to download the package database to the device using the ONC 218. Thus, the latest version of the package database is transparently downloaded and stored on the device.

At block 314, a test is performed to determine if a subscription request has been received from a device user that would like to subscribe to one or more packages available in the downloaded package database. For example, the client 220 running on the device operates to present the device user with a program guide of available packages for subscription. The device user selects one or more packages and the client 220 assembles a subscription request that is transmitted to the server 200 using a device-to-server protocol. The subscription request includes information about the requesting device and the number and types of packages to which the user wishes to subscribe. Thus, if a subscription request is received at the server 200, the method proceeds to block 318. If a subscription request is not received, the method proceeds to block 316.

At block 316, a test is performed to determine of an update package database is available for transmission to one or more devices. For example, as more service packages become available, the package database that was downloaded to the device is updated with new information (accounting for any device affiliations) to allow devices to subscribe to the newly available service packages. For example, the processing logic 202 operates to update the service database 206 with new service package information provided by all service providers. If a new package database is available for the device, taking into account any affiliations, the method proceeds to block 312 where the new package database is transparently downloaded to the device via the ONC 218. If a new package database is not available, the method proceeds to block 314 where the test is performed to determine if a new subscription request has been received.

At block 318, the server has received a new subscription request from a device, which is processed to allow the device to subscribe to one or more service packages. For example the subscription request is transmitted using a device-to-server subscription protocol. The subscription request is received and processed by the processing logic 202 so that the device transmitting the subscription request may subscribe to one or more service packages identified in the request. In one embodiment, the service packages are those offered by a particular service provider based on any existing affiliations.

At block 320, the requested services that have been subscribed to are provided to the device. For example the server 200 operates to retrieve the requested services from the service database 206 and transmit the services, via the transceiver logic 210, to the device via a wireless network connection. In another embodiment, the server 200 operates to authorize a content provider, or other third party service provider, to provide the subscribed services to the device. The method then ends at block 322.

It should be noted that the method 300 illustrates just one embodiment and that changes, additions, or rearrangements of the described functions may be made without deviating from the scope of the described embodiments. For example, in another embodiment, the functions of the service package generation logic 226 are performed at the device. In this embodiment, filtering of all available service packages is performed at the device. The server 200 operates to transmit a package database to the device that lists all services available from all service providers. The device then filters this information to display those services available to the device based on any existing affiliations. Thus, the filtering of services may be performed at the content distribution server 200 or the requesting device.

Figure 4:
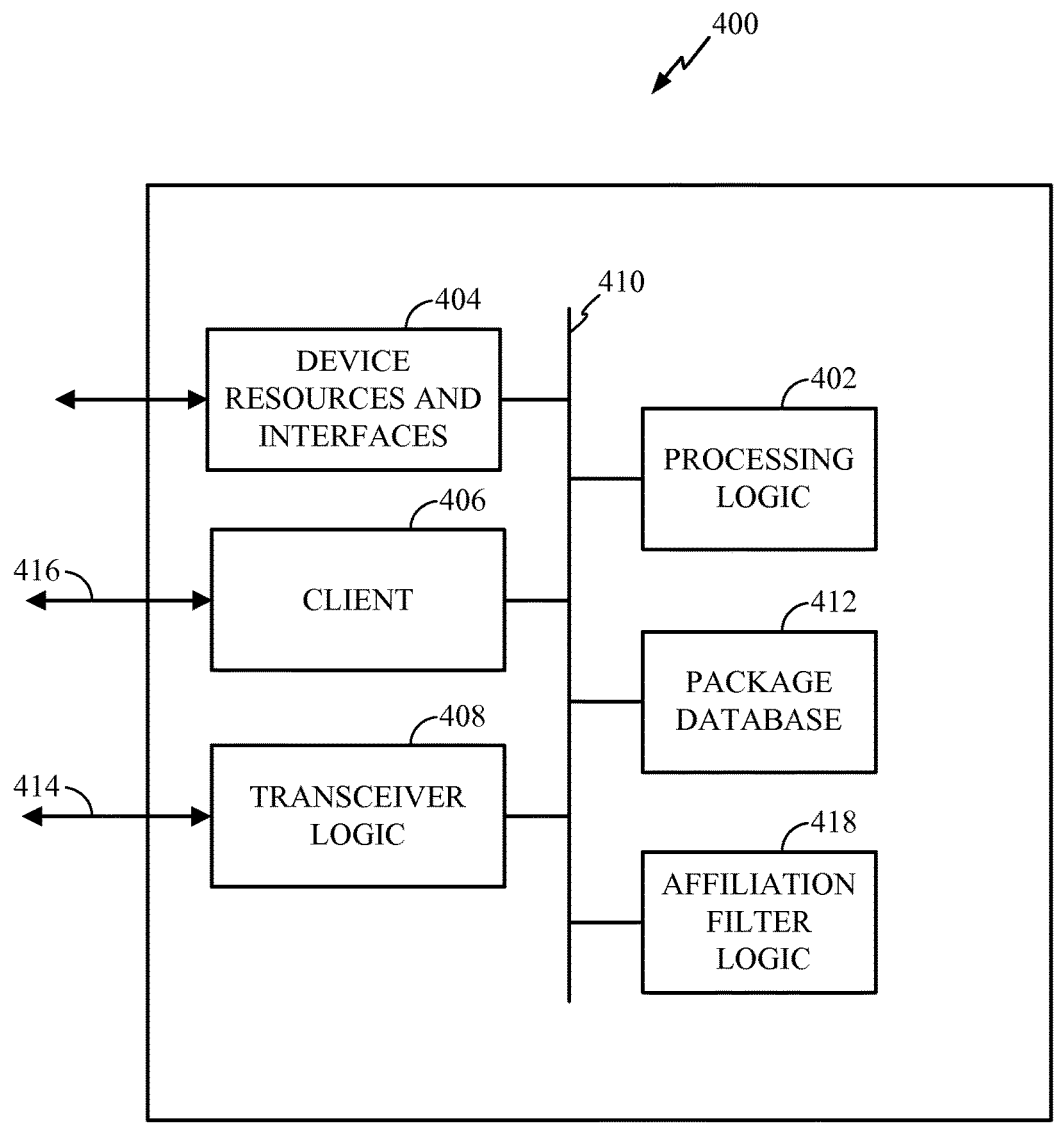
FIG. 4 shows a detailed diagram of one embodiment of a device suitable for use in one embodiment of a system for hosting multiple service providers.

FIG. 4 shows a detailed diagram of one embodiment of a device 400 suitable for use in one embodiment of a system for hosting multiple service providers. The device 400 comprises processing logic 402, device resources and interfaces 404, and transceiver logic 408, all coupled to a data bus 410. The device 400 also comprises client logic 406, package database 412, and affiliation filter logic 418, which are also coupled to the data bus 410.

In one or more embodiments, the processing logic 402 comprises a CPU, processor, gate array, hardware logic, memory elements, virtual machine, software, and/or any combination of hardware and software. Thus, the processing logic 402 generally comprises logic to execute machine-readable instructions and to control one or more other functional elements of the device 400 via the internal data bus 410.

The device resources and interfaces 404 comprise hardware and/or software that allow the device 400 to communicate with internal and external systems. For example, internal systems may include mass storage systems, memory, display driver, modem, or other internal device resources. The external systems may include user interface devices, printers, disk drives, or other local devices or systems.

The transceiver logic 408 comprises hardware and/or software that operate to allow the device 400 to transmit and receive data and/or other information with external devices or systems via communication channel 414. For example the communication channel 414 may comprise a network communication link, a wireless communication link or any other type of communication link.

During operation, the device 400 is activated to operate using one or more embodiments of a system for hosting multiple service providers. For example, the device user controls the device to communicate with a content distribution server (i.e., server 106) for the purpose of completing a one-time activation process. During the activation process, the device and/or the content distribution server discover any affiliations associated with the device. The client logic 406 is installed on the device, and an overhead notification channel 416 is established with the content distribution server. The server then uses the channel 416 to download a package database 412 to the device.

In one embodiment, the package database 412 comprises a list of services that are available to the device 400. In one embodiment, the package database is filtered at the content distribution server so that the identified services represent services from a selected service provider in accordance with device affiliations. In another embodiment, the package database 412 comprises services that are available from all service providers associated with the content distribution server, and the affiliation filter logic 418 operates to filter these services to determine only those services available to the device in accordance with device affiliations. For example, the affiliation filter logic 418 comprises any suitable hardware and/or software to process the package database 412.

The client logic 406 provides a user interface (UI) that allows the device user to view the available service packages identified in the package database. The client logic 406 also allows the device user to select one or more packages for subscription. The selected packages are identified in a subscription request that is part of a device-to-server protocol, which is implemented by the client 406. The client 406 then transmits the subscription request to the content distribution server. In one or more embodiments, the client 406 comprises machine-readable instructions that are executed by the processing logic 402 to perform the functions described herein.

The package database 412 comprises any type of memory suitable for storing information relating to service packages that are available for subscription. For example, the package database 412 may comprise package and/or service identifiers, scheduling information, pricing, and/or any other information about the available service packages.

In one embodiment, a device performs one or more of the following functions in one or more embodiments of a system for hosting multiple service providers. It should be noted that the following functions may be changed, rearranged, modified, add to, or otherwise adjusted within the scope of the embodiments.
1. The device is activated with a content distribution system.
2. Affiliations associated with the device are discovered.
3. The device receives and installs a client program and an overhead notification mechanism.
4. The device receives a package database from a content distribution server that is transparently transmitted to the device using the overhead notification mechanism.
5. In one embodiment, the package database includes information about only those service packages available to the device because the content distribution server has filtered the available services in accordance with device affiliations.
6. In another embodiment, the package database includes information about all services available at the content distribution server, and the affiliation filter logic at the device operates to filter the package database to include only those services available to the device in accordance with any affiliations.
7. A program guide displays the available services to the device user.
8. After the user selects one or more service packages, the client assembles a subscription request that is transmitted to the content distribution system using a server-to-device protocol.
9. After the subscription request has been process by the content distribution system, the device receives the services for which the user has subscribed.

In one embodiment, the system to host multiple service providers comprises program instructions stored on a computer-readable media, which when executed by the processing logic 402, provides the functions of the device 400 described herein. For example, instructions may be loaded into the device 400 from a computer-readable media, such as a floppy disk, CDROM, memory card, FLASH memory device, RAM, ROM, or any other type of memory device or computer-readable media that interfaces to the device 400 via the device resources 404. In another embodiment, the instructions may be downloaded into the device 400 from a network resource that interfaces to the device 400 via the transceiver logic 408. The instructions, when executed by the processing logic 402, provide one or more embodiments of a system to host multiple service providers as described herein.

Figure 5:
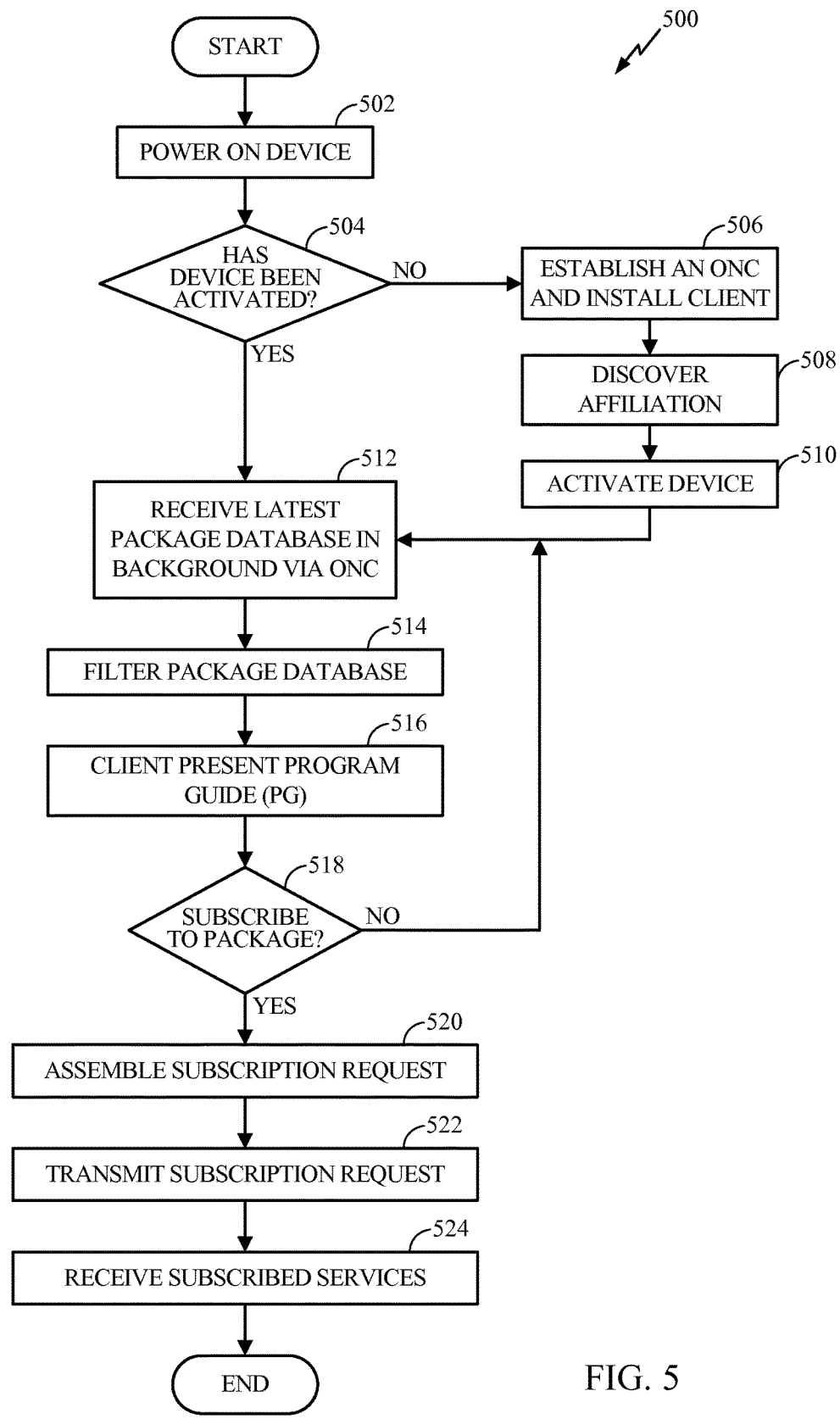
FIG. 5 shows one embodiment of a method for operating a terminal in one or more embodiments of a system to host multiple service providers.

FIG. 5 shows one embodiment of a method 500 for operating a device in one or more embodiments of a system to host multiple service providers. For clarity, the method 500 will be described with reference to the device 400 shown in FIG. 4. For example, the device 400 is suitable for use as any of the devices 116 shown in FIG. 1. In one or more embodiments, the processing logic 402 executes program instructions to control the device 400 to perform the functions described below.

At block 502, a device user powers on the device. In one embodiment, after powering up, the device operates to establish communication with a data network over a wireless communication link. For example, the processing logic 402 controls the transceiver logic 408 to establish a wireless communication link with a data network, such as the provider network 108.

At block 504, a test is performed to determine if the device has been activated with a content distribution server. If the device has been activated, the device actives a client program and the method proceeds to block 510. If the device has not been activated, the method proceeds to block 506.

At block 506, the device is activated with the content distribution server. For example, in one embodiment, the processing logic 402 communicates with a content distribution server via the transceiver logic 408 to identify the device and provide any other activation information that may be required.

At block 508, the affiliation status of the device is discovered. For example, the content distribution server and/or the device discover that the device is affiliated with a particular service provider. For example, the processing logic 402 operates to determine that the device is an affiliated device.

At block 510, as part of the activation process, a client is installed on the device and an overhead notification mechanism is established to allow transparent communications between the device and the content distribution server. For example, in one embodiment, the client logic 406 establishes the ONC 416 with the content distribution server. The method then proceeds to block 512.

At block 512, the client operates to receive the latest package database from the content distribution server. The package database represents service packages that are available for the device to purchase and/or subscript to. For example the client logic 406 operates to receive the most recent package database in a transparent communication from a content distribution server via the ONC 416. The package database is stored at the device 400 as the package database 412.

At block 514, the package database of services is filtered if the package database has not been filtered to account for any affiliations. For example, in one embodiment, the content distribution server filters to package database according to any affiliations discovered during the activation process. In another embodiments the affiliation filter logic 418 filters to the package database at the device. For example, the affiliation filter logic 418 filters the package database to include only those services provided by a particular service provider in accordance with the discovered affiliations. Thus, after filtering, the package database includes only those services that are available to the device for purchase and/or subscription from a particular service provider.

At block 516, the client installed on the device operates to display a program guide to the device user. The program guides provides information to the device user about the service packages available for subscription. For example, the information includes scheduling, pricing, availability, and any other relevant information. In one embodiment, the client 406 operates to display information from the package database 412 in the program guide.

At block 518, a test is performed to determine if the user wishes to subscribe to one or more available service packages. For example the user may selects one or more service packages from the displayed program guide and request to subscribe to those packages. If the user selects any program packages for subscription, the method proceeds to block 520. If the user does not select any packages for subscription, the method proceeds to block 510, where the device may receive an updated copy of the package database if one is available.

At block 520, the client program operates to assemble a subscription request to allow the device user to subscribe to the selected packages. For example, the subscription request is assembled in accordance with a device-to-service protocol that allows one or more packages to be identified for subscription. For example, in one embodiment, the client logic 406 operates to assemble the subscription request.

At block 522, the completed subscription request is transmitted to a content distribution server. For example, the subscription request may be transmitted to the content distribution server 106 shown in FIG. 1. The subscription request identifies one or more service packages to which the device user wishes to subscribe. In one embodiment, the transceiver logic 408 transmits the subscription request, over-the-air, to the content server using the communication link 414.

At block 524, after the content distribution server has processed the subscription request, the subscribed services are delivered to the device. For example, in one embodiment, the subscribed for services are delivered to the device from the content distribution server via the communication link 414. In another embodiment, the subscribed for services are delivered to the device from a third-party content provider or other content server.

Thus, the method 500 operates to allow a device to subscribe to one or more service packages provided in a system for hosting multiple service providers. It should be noted that the method 500 illustrates just one embodiment and that changes, additions, or rearrangements of the functional elements may be made without deviating from the scope of the described embodiments.

Accordingly, while one or more embodiments of a system for hosting multiple service providers has been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for operating a device in a data network, comprising:
   determining, by the device, whether the device has an affiliation with a particular service provider among a plurality of service providers in one or more proprietary data networks that limits the device to receiving services from the particular service provider, wherein determining whether the device has an affiliation comprises:
      comparing a unique device identifier of the device with unique device identifiers of affiliated devices associated with each of the plurality of service providers; and
      determining a match between the unique device identifier and a matching unique device identifier of the particular service provider;
   receiving, by the device from a server, information describing a plurality of services offered by the plurality of service providers in the one or more proprietary data networks;
   in response to determining that the device has an affiliation with the particular service provider:
      filtering, by the device, the received information from the server describing the plurality of services offered by the plurality of service providers in the one or more proprietary data networks based on the affiliation between the device and the particular service provider to determine one or more selected services available to the device from the particular service provider; and
      requesting, by the device from the server, at least one of the determined one or more selected services available to the device from the particular service provider.

2. The method of claim 1, wherein requesting, by the device from the server, at least one of the determined one or more selected services available to the device from the particular service provider comprises transmitting, from the device, a subscription request that identifies at least one of the determined one or more selected services available to the device from the particular service provider.

3. The method of claim 1, further comprising:
   receiving, at the device, updated information describing the plurality of services offered by the plurality of service providers;
   filtering, at the device, the received updated information based on the affiliation to determine one or more updated selected services available to the device from the particular service provider; and
   requesting, by the device from the server, at least one of the determined one or more updated selected services available to the device from the particular service provider.

4. A device, comprising:
   means for determining whether the device has an affiliation with a particular service provider of a plurality of service providers in one or more proprietary data networks that limits the device to receiving services from the particular service provider that comprises:
      means for comparing a unique device identifier of the device with unique device identifiers of affiliated devices associated with each of the plurality of service providers; and
      means for determining a match between the unique device identifier and a matching unique device identifier of the particular service provider;
   means for receiving information from a server describing a plurality of services offered by the plurality of service providers in the one or more proprietary data networks;
   means for filtering the received information from the server describing the plurality of services offered by the plurality of service providers in the one or more proprietary data networks based on the affiliation between the device and the particular service provider to determine one or more selected services available to the device from the particular service provider and means for requesting from the server at least one of the determined one or more selected services available to the device from the particular service provider in response to determining that the device has an affiliation with the particular service provider.

5. The device of claim 4, wherein means for requesting from the server at least one of the determined one or more selected services available to the device from the particular service provider comprises means for transmitting a subscription request that identifies at least one of the determined one or more selected services available to the device from the particular service provider.

6. The device of claim 4, further comprising:
   means for receiving updated information describing the plurality of services offered by the plurality of service providers;
   means for filtering the received updated information based on the affiliation to determine one or more updated selected services available to the device from the particular service provider; and means for requesting from the server at least one of the determined one or more updated selected services available to the device from the particular service provider.

7. A device, comprising:
a network interface configured to communicate with a data network; and
a processor coupled to the network interface, wherein the processor is configured with processor-executable instructions to perform operations comprising:
   determining whether the device has an affiliation with a particular service provider among a plurality of service providers in one or more proprietary data networks that limits the device to receiving services from the particular service provider, wherein determining whether the device has an affiliation comprises:
      comparing a unique device identifier of the device with unique device identifiers of affiliated devices associated with each of the plurality of service providers; and
      determining a match between the unique device identifier and a matching unique device identifier of the particular service provider;
   receiving information from a server describing a plurality of services offered by the plurality of service providers in the one or more proprietary networks via the network interface;
   in response to determining that the device has an affiliation with the particular service provider:
      filtering the received information from the server describing the plurality of services offered by the plurality of service providers in the one or more proprietary data networks based on the affiliation between the device and the particular service provider to determine one or more selected services available to the device from the particular service provider; and
      requesting from the server at least one of the determined one or more selected services available to the device from the particular service provider.

8. The device of claim 7, wherein the processor is configured with processor-executable instructions to perform operations such that requesting from the server at least one of the determined one or more selected services available to the device from the particular service provider comprises transmitting, via the network interface, a subscription request that identifies at least one of the determined one or more selected services available to the device from the particular service provider.

9. The device of claim 7, wherein the processor is configured with processor-executable instructions to perform operations further comprising:
   receiving updated information describing the plurality of services offered by the plurality of service providers via the network interface;
   filtering the received updated information based on the affiliation to determine one or more updated selected services available to the device from the particular service provider; and
   requesting from the server at least one of the determined one or more updated selected services available to the device from the particular service provider.

10. A non-transitory computer readable storage medium having stored thereon processor-executable instructions configured to cause a processor of a device to perform operations comprising:
   determining whether the device has an affiliation with a particular service provider among a plurality of service providers in one or more proprietary data networks that limits the device to receiving services from the particular service provider, wherein determining whether the device has an affiliation comprises:
      comparing a unique device identifier of the device with unique device identifiers of affiliated devices associated with each of the plurality of service providers; and
      determining a match between the unique device identifier and a matching unique device identifier of the particular service provider;
   receiving information from a server describing a plurality of services offered by the plurality of service providers;
   in response to determining that the device has an affiliation with the particular service provider:
      filtering the received information from the server describing the plurality of services offered by the plurality of service providers in the one or more proprietary data networks based on the affiliation between the device and the particular service provider to determine one or more selected services available to the device from the particular service provider; and
      requesting from the server at least one of the determined one or more selected services available to the device from the particular service provider.

11. The non-transitory computer readable storage medium of claim 10, wherein the stored processor-executable instructions are configured to cause the processor to perform operations such that requesting from the server at least one of the determined one or more selected services available to the device from the particular service provider comprises transmitting a subscription request that identifies at least one of the determined one or more selected services available to the device from the particular service provider.

12. The non-transitory computer readable storage medium of claim 10, wherein the stored processor-executable instructions are configured to cause a processor to perform operations further comprising:
   receiving updated information describing the plurality of services offered by the plurality of service providers;
   filtering the received updated information based on the affiliation to determine one or more updated selected services available to the device from the particular service provider; and
   requesting from the server at least one of the determined one or more updated selected services available to the device from the particular service provider.

* * * * *